(12) United States Patent
Hultquist et al.

(10) Patent No.: US 7,570,728 B2
(45) Date of Patent: Aug. 4, 2009

(54) NUCLEAR FUEL ROD

(75) Inventors: Gunnar Hultquist, Stallarholmen (SE); Magnus Limbäck, Västerås (SE); Per Tägtström, Skultuna (SE); Eric Hörnlund, Stockholm (SE)

(73) Assignee: Westinghouse Electric Sweden AB (SE)

( * ) Notice: Subject to any disclaimer, the term of this patent is extended or adjusted under 35 U.S.C. 154(b) by 59 days.

(21) Appl. No.: 10/537,954

(22) PCT Filed: Dec. 5, 2003

(86) PCT No.: PCT/SE03/01902

§ 371 (c)(1),
(2), (4) Date: Jun. 8, 2005

(87) PCT Pub. No.: WO2004/057624

PCT Pub. Date: Jul. 8, 2004

(65) Prior Publication Data

US 2006/0050836 A1    Mar. 9, 2006

(30) Foreign Application Priority Data

Dec. 20, 2002   (SE) .................................... 0203815

(51) Int. Cl.
*G21C 3/00* (2006.01)
(52) U.S. Cl. ................. 376/409; 376/410; 376/412; 376/414
(58) Field of Classification Search ................ 376/409, 376/410, 412, 414
See application file for complete search history.

(56) References Cited

U.S. PATENT DOCUMENTS

| | | | | |
|---|---|---|---|---|
| 3,677,894 A | * | 7/1972 | Ferrari | 376/413 |
| 4,609,524 A | * | 9/1986 | Ferrari | 376/417 |
| 4,810,461 A | * | 3/1989 | Inagaki et al. | 376/457 |
| 4,894,203 A | * | 1/1990 | Adamson | 376/416 |
| 5,329,566 A | * | 7/1994 | King | 376/418 |
| 5,437,747 A | * | 8/1995 | Adamson et al. | 148/519 |
| 2001/0019597 A1 | | 9/2001 | Rudling et al. | |

FOREIGN PATENT DOCUMENTS

| | | |
|---|---|---|
| DE | 2624326 A | 4/1978 |
| EP | 116888 A | 8/1984 |

(Continued)

OTHER PUBLICATIONS

European Search Report for EP93104164, dated Jul. 12, 1993.

*Primary Examiner*—Rick Palabrica
(74) *Attorney, Agent, or Firm*—Michaud-Duffy Group LLP

(57) ABSTRACT

In a nuclear fuel rod a cladding tube is provided having a closed inner space and manufactured from at least one of the materials in the group zirconium and a zirconium-based alloy, and a pile of nuclear fuel pellets arranged in the inner space in the cladding tube. The nuclear fuel pellets fill part of the inner space. A fill gas is arranged in the closed inner space to fill the rest of the inner space. The internal pressure of the fill gas in the nuclear fuel rod amounts to at least 2 bar (abs) or at least 10 bar (abs). The fill gas contains a proportion of inert gas a proportion of carbon monoxide that is greater than 3 volume percent of the fill gas or greater than 2 volume percent of the fill gas.

7 Claims, 5 Drawing Sheets

FOREIGN PATENT DOCUMENTS

| | | |
|---|---|---|
| EP | A1-566862 | 10/1993 |
| EP | A1-869512 | 10/1998 |
| GB | 1217504 A | 12/1970 |
| JP | 55152494 | 11/1980 |
| JP | 58147676 | 9/1983 |
| JP | 7077589 | 3/1995 |
| JP | 7244180 | 9/1995 |
| WO | WO 01/71728 | 9/2001 |

* cited by examiner

NUCLEAR FUEL ROD

BACKGROUND OF THE INVENTION AND PRIOR ART

The present invention concerns a nuclear fuel rod for a nuclear reactor of the boiling water or pressurized water type, comprising a cladding tube that defines a closed inner space and which is manufactured from at least one of the materials in the group zirconium and a zirconium-based alloy, a pile of nuclear fuel pellets arranged in the inner space in the cladding tube so that the nuclear fuel pellets fill part of the inner space, and a fill gas arranged in the closed inner space to fill the rest of the inner space, whereby the fill gas contains a proportion of helium and a proportion of carbon monoxide. The invention also concerns a nuclear fuel assembly comprising such a nuclear fuel rod. Furthermore the invention concerns a method for manufacturing a nuclear fuel rod for a nuclear reactor of the boiling water or pressurized water type.

A nuclear plant comprises a reactor core that is formed from a number of fuel assemblies. Each fuel assembly comprises a plurality of elongated, parallel nuclear fuel rods and a plurality of spacers that are axially distributed along, and associated with, the nuclear fuel rods. Each nuclear fuel rod comprises a cladding tube and nuclear fuel that is enclosed in the cladding tube. The nuclear fuel usually comprises uranium that is compressed into fuel pellets arranged on top of one another in a pile in the cladding tube. When the nuclear plant is in operation the reactor core is cooled by means of a cooling medium that is pumped upwards through the reactor core.

The components in nuclear plants are often subjected to attacks caused by hydrogenation and oxidation. It is known to provide such exposed components with a surface coating to protect the components. The nuclear fuel rods' cladding tubes are an example of such components. The attack of a cladding tube means that a defect extending through the whole thickness of the cladding tube occurs in the worst case, whereby the radioactive nuclear fuel and its fission products that are inside the cladding tube can leak out into the reactors cooling water. As regards defects to the cladding tubes, one differentiates between primary and secondary defects.

A primary defect occurs by attack on the outer surface of the cladding tube and is especially caused by abrasion by foreign objects. A minor abrasive defect does not normally give rise to any evident destruction and washing out of the nuclear fuel rod's uranium pellets. A primary defect can however extend through the whole thickness of the cladding tube. Such a primary defect means that water, steam, or a combination of these, flows into the cladding tube into a space between the nuclear fuel and the inner surface of the cladding tube.

When a primary defect has developed there is a communication path between the cladding tube's inner space and the reactor's cooling water. Water and steam will therefore force their way into the nuclear fuel rod until the nuclear fuel rod's internal pressure $P_i$ is the same as the reactor's system pressure $P_{sys}$. During this course of events the inside of the cladding tube and the uranium pellets oxidize during the release of hydrogen from the water molecules. This in turn results in that one can obtain an environment with a very high partial pressure of hydrogen, $ppH_2$ so called "oxygen starvation" or "steam starvation" at a distance from the primary defect. In such an environment the inside of the cladding tends to absorb hydrogen very quickly, so called hydrogenation. The hydrogenation can lead to a very high hydrogen concentration locally in the cladding, which is called secondary degrading and which in turn strongly deteriorates the cladding's mechanical properties. The cladding becomes very brittle and this can give rise to the inducement of cracks, crack growth and the development of a secondary fuel defect due to self-induced stresses or due to outer loading. A secondary defect often takes the form of long cracks or transverse fracture, which means that this is a serious form of defect.

If a defect is such that water flows into the nuclear fuel rod the water will be vaporized and water molecules will dissociate, whereby the cladding tube's inner surface oxidizes and free hydrogen is formed in the inner space. The free hydrogen will be absorbed by the zirconium-based cladding tube, whereby the above-mentioned embrittlement occurs. Absorption takes place particularly on the surfaces where an oxide layer has not yet formed. This process is relatively fast. The oxidation process is initiated immediately after a primary defect has occurred. This quickly results in the occurrence of an environment with very high partial pressure of hydrogen at a distance from the primary defect, as a consequence of this, the hours and days following the occurrence of a primary defect are of great importance for the possibilities of influencing the secondary hydrogenation and thereby the risk of a secondary defect occurring. A problem in this context is that hydrogen gas diffuses faster in the helium gas that is normally found in the inner space than water molecules. The hydrogen gas will therefore reach the free surfaces faster than the water molecules that could otherwise react with the surface during the formation of a protective oxide layer on the zirconium surface.

U.S. Pat. No. 4,609,524 discloses a closed tube for a nuclear reactor. The tube is intended to contain nuclear fuel and/or a neutron absorber. The fuel and/or the absorber are enclosed in the tube together with a fill gas consisting of He and an additional gas containing one of the gases $O_2$, CO and $CO_2$. The purpose of the additional gas is to provide a thin oxide layer on the inner surface of the cladding tube. The oxide layer is thought to reduce the permeability of triterium (an isotope of hydrogen) through the tube under normal operation. According to that which is stated in this document triterium is released during irradiation in the nuclear reactor. The document does not discuss the problems that occur in connection with a defect to the fuel rods. The purpose of the additional gas is therefore not to prevent hydrogenation and secondary degrading. The amount of the additional gas in the fill gas amounts to 2-3 volume percent of the amount of helium. The amount of additional gas in relation to the amount of fill gas is therefore less than 3 volume percent.

SUMMARY OF THE INVENTION

The aim of the present invention is to improve a nuclear fuel rod's resistability against secondary degrading. More particularly the invention concerns preventing secondary hydrogenation and a secondary defect after a typical primary defect has occurred to a nuclear fuel rod. Even though the occurrence of a primary defect is unusual substantial advantages are gained if the risk of a primary defect leading to secondary hydrogenation, secondary degrading and the occurrence of a secondary defect can be reduced.

This aim is achieved with the nuclear fuel rod for a nuclear reactor of the boiling water type disclosed by way of introduction, which is characterized in that the internal pressure of the fill gas in the nuclear fuel rod amounts to at least 2 bar (abs) and that the proportion of carbon monoxide is at least 3 volume percent of the fill gas. The invention involves that a certain fraction of the fill gas that is added in connection with the manufacture of the fuel rod shall be constituted of carbon monoxide. The fill gas can therefore be constituted of a mixture of helium and carbon monoxide. Since the carbon monoxide is not used up by absorption of the fuel or the cladding tube it is guaranteed that the fill gas will contain carbon monoxide even after the nuclear fuel rod has been in operation for a substantial part of its total operation time. The invention is based on the insight that a modification of the fill gas that is normally used reduces the cladding's capability of absorbing hydrogen. Investigations have shown that CO has an effect that does not in itself result in the oxidation of Zr, but rather involves the blocking of adsorption sites for hydrogen, i.e. CO is adsorbed in those positions on the zirconium surface where hydrogen would otherwise have been adsorbed in order to be absorbed by the zirconium material later. The lower limitation for the partial pressure of CO in relation to the partial pressure of He, ppCO/ppHe, is defined by the amount of carbon monoxide that is consumed in order to obtain a substantial reduction of the hydrogen absorption speed after hypothetical a primary defect, while an upper limit for ppCO/ppHe is limited by the gas mixture's thermal conductivity. If the thermal conductivity of the fill gas is drastically reduced, compared to the case where the fill gas is substantially constituted of helium only, the thermal conductivity between the fuel pellets and the cladding is worsened, which results in an enhanced pellet temperature and an increased fission gas emission. A certain deterioration of the gas mixture's thermal conductivity is acceptable, but the upper limit for ppCO/ppHe must be chosen so that the fission gas emission does not yield an undesired burn-out limitation. This consequently involves that the upper limit for ppCO/ppHe is dependent on the burn-out level that the actual nuclear fuel rod is intended to be exposed to.

When one considers the surface of a component manufactured from zirconium or a zirconium-based alloy one can even observe that gases have a varying disposition to adsorption on the actual surface. CO has a relatively high adsorption disposition that can be schematically organised according to the following: $H_2O > CO > H_2 > N_2 > He$. Laboratory investigations have shown that even a smaller fraction of CO in the fill gas of the order of magnitude given in claim 1 strongly reduces the zirconium-based material's hydrogen absorption speed Zr. This means that the hydrogen absorption speed can be reduced during the essential course of events directly after a primary defect has occurred. If one could in this way avoid hydrogen absorption that gives rise to very high hydrogen contents locally, one could even strongly reduce the risk of occurrence of a secondary defect.

According to an embodiment of the invention the proportion of carbon monoxide constitutes at least 4 volume percent of the fill gas. The applicant has shown that the strived for effect, to prevent hydrogen absorption, is improved using an increasing proportion of carbon dioxide in the fill gas. The proportion of carbon dioxide can therefore advantageously constitute at least 5 volume percent of the fill gas and even more advantageously at least 6 volume percent of the fill gas.

The aim is also achieved with the nuclear fuel rod disclosed by way of introduction for a nuclear reactor of the pressurized water type, which is characterized in that the internal pressure of the fill gas in the nuclear fuel rod amounts to at least 10 bar (abs) and that the proportion of carbon monoxide is at least 2 volume percent of the fill gas. Advantages corresponding to those stated above for a nuclear reactor of the boiling water type are achieved using such a nuclear fuel rod in a nuclear reactor of the pressurized water type.

According to further embodiments of the nuclear fuel rod for a nuclear reactor of the pressurized water type the proportion of carbon monoxide amounts to at least 3 volume percent of the fill gas, at least 4 volume percent of the fill gas and especially at least 5 volume percent of the fill gas.

According to a further embodiment of the invention the cladding tube has an inner surface that faces the inner space, whereby the material in the cladding tube nearest to the inner space is pre-oxidized and therefore contains zirconium oxide. It is known to coat the inner surface of the cladding tube with a thin zirconium oxide layer. Such an oxide layer has a protective effect against absorption of hydrogen in the zirconium material. In combination with the addition of carbon monoxide in accordance with this invention the reduction of the hydrogen absorption in the zirconium material can thus be considerably improved.

The aim is also achieved with the method given by way of introduction for manufacturing a nuclear fuel rod for a nuclear reactor of the boiling water type, whereby the method comprises the steps of:

providing a cladding tube that defines an inner space and which is manufactured of at least one of the materials in the group zirconium and a zirconium-based alloy, introducing a pile of nuclear fuel pellets, that is arranged in the inner space in the cladding tube so that the nuclear fuel pellets fill part of the inner space, and filling up the inner space with a fill gas, that contains a proportion of inert gas and a proportion of carbon monoxide, in order to fill the rest of the inner space and concluding the inner space when an internal pressure, that amounts to at least 2 bar (abs), exists in the inner space, whereby the proportion of carbon monoxide is greater than 3 volume percent of the fill gas.

The aim is also achieved with a method given by way of introduction for manufacturing a nuclear fuel rod for a nuclear reactor of the pressurized water type, whereby the method comprises the steps of:

providing a cladding tube that defines an inner space and which is manufactured from at least one of the materials in the group zirconium and a zirconium-based alloy, introducing a pile of nuclear fuel pellets, that is arranged in the inner space of the cladding tube so that the nuclear fuel pellets fill part of the inner space, and filling up the inner space with a fill gas, that contains a proportion of inert gas and a proportion of carbon monoxide, in order to fill the rest of the inner space and concluding the inner space when an internal pressure, that amounts to at least 10 bar (abs), exists in the inner space, whereby the proportion of carbon monoxide is greater than 2 volume percent of the fill gas.

According to an embodiment of the nuclear fuel rod the cladding tube comprises an inner surface that faces the inner space, whereby the method can comprise the step of supplying the inner surface with an outer layer that comprises zirconium oxide before the nuclear fuel pellets and the fill gas are introduced into the cladding tube. In combination with the added carbon monoxide gas such an oxide layer leads to a further reduction of the hydrogen absorption in the zirconium material.

BRIEF DESCRIPTION OF THE FIGURES

The invention will now be explained in more detail by means of a description of the different embodiments and with reference to the appended figures.

DETAILED DESCRIPTION OF DIFFERENT EMBODIMENTS OF THE INVENTION

Figure 1:
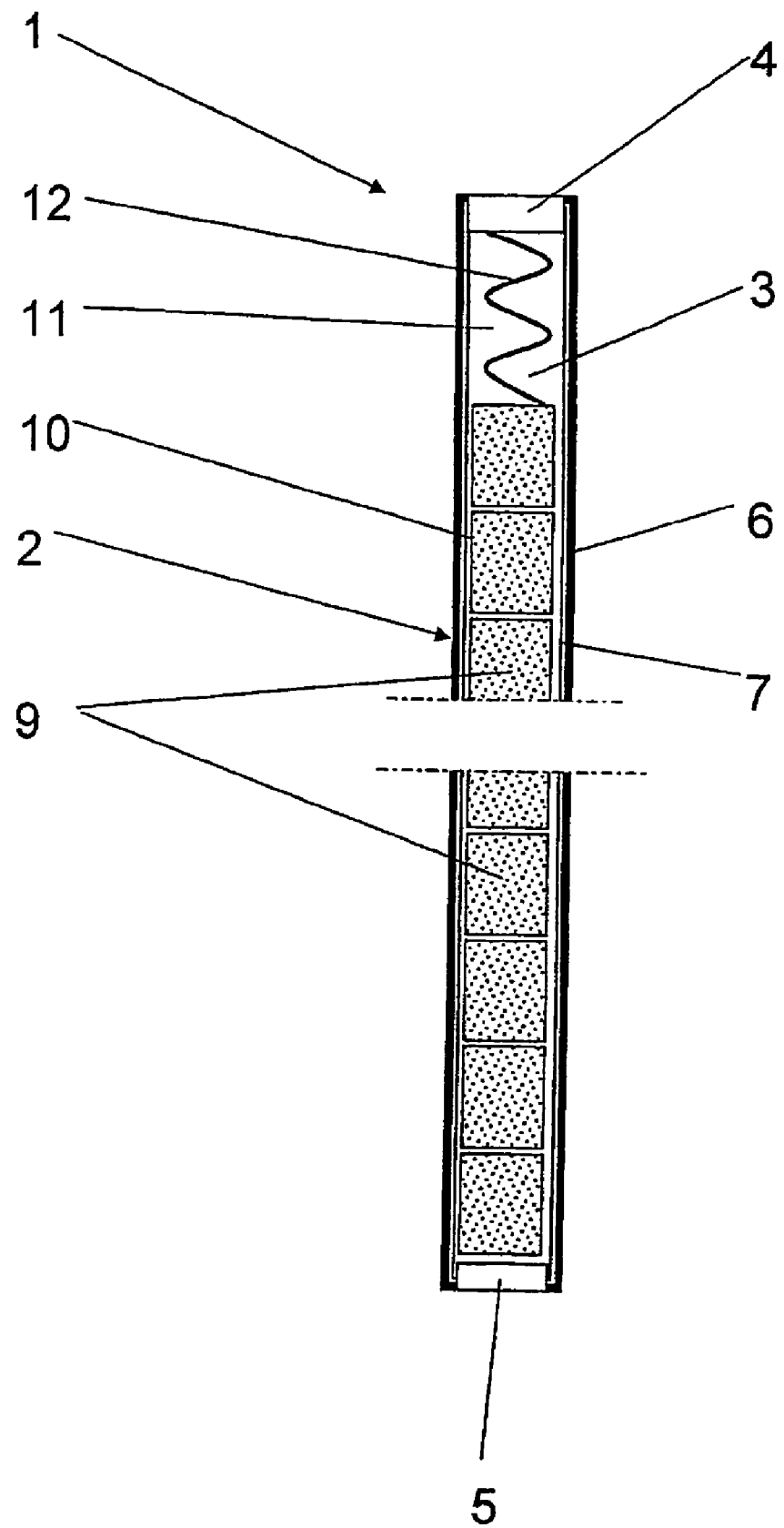
FIG. 1 schematically shows a lengthwise cross section of a nuclear fuel rod according to the invention.

FIG. 1 schematically shows a nuclear fuel rod 1 for a nuclear reactor of the light water type. The nuclear reactor can be a boiling water reactor (BWR) or a pressurized water reactor (PWR). The nuclear fuel rods comprise a cladding tube 2 that defines a closed inner space 3. The cladding tube 2 has a first upper end that is concluded with a top plug 4 and a second lower end that is concluded with a bottom plug 5.

The cladding tube 2 is manufactured from at least one of the materials in the group zirconium and a zirconium-based alloy. Such a zirconium-based alloy can be ZIRCALOY-2 or ZIRCA-LOY-4. In the embodiment shown the cladding tube 2 also comprises an outer tube 6 and an inner tube 7, whereby the inner tube 7 forms a so called liner, that is manufactured so that it has a metallic binding to the outer tube 6. The outer tube 6 can be manufactured from any of the above-mentioned zirconium-based alloys while the inner tube 7 can be manufactured of pure zirconium metal. It should be noted that the cladding tube 2 may comprise only one tube without a liner.

The nuclear fuel rods 1 also comprise a pile of fuel pellets 9 that are arranged in the inner space 3 in the cladding tube 2. The fuel pellets 9 that are of the conventional type comprise compressed uranium oxide. The pile of fuel pellets 9 fills part of the inner space 3, whereby there is a narrow gap 10 between the fuel pellets 9 and the inner tube's 7 inner surface. Furthermore there is a plenum 11 in the inner space 3, above the fuel pellets 9 for example whereby the pile of fuel pellets 9 is pressed against the lower bottom plug 5 with the help of resilient means 12.

The nuclear fuel rods 1 also contain a fill gas that is arranged in the inner space 3 and which fills the rest of the inner space 3, i.e. essentially the gap 10, said plenum 11 and possibly gaps between the fuel pellets 9. The fill gas contains a proportion of inert gas and a proportion of carbon monoxide. In the embodiment shown the fill gas consists essentially of said proportion of inert gas and said proportion of carbon monoxide. The inert gas consists essentially of helium but even other inert gases are possible.

Figure 2:
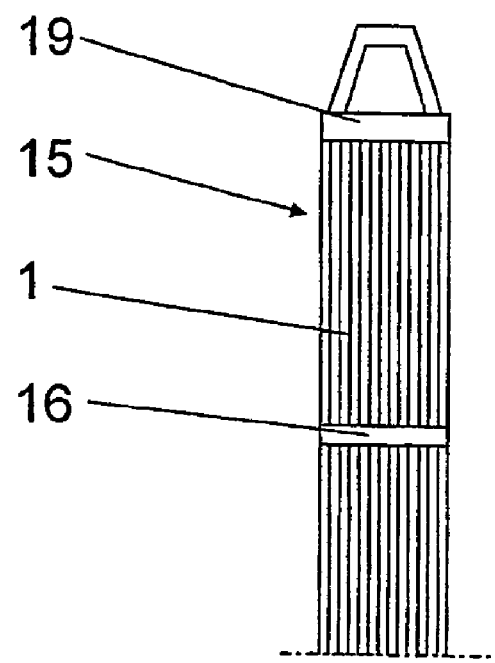
FIG. 2 schematically shows a partial, sectioned side view of a nuclear fuel assembly for a boiling water reactor with a number of nuclear fuel rods according to the invention.
Figure 2:
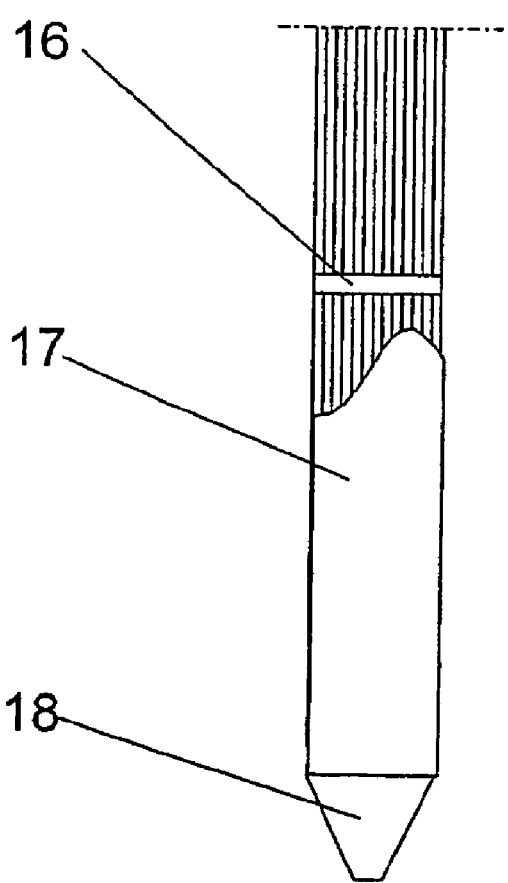

FIG. 2 schematically shows an example of a nuclear fuel assembly 15 that is intended for a boiling water reactor and which comprises a number of nuclear fuel rods 1 according to the present invention. The fuel rods 1 are connected to one another and are held at the correct distance from one another by means of a number of spacers 16. The nuclear fuel rods 1 can furthermore be enclosed in a box 17 that forms a partially shown casing around the rods 1 and that extends from a lower plate 18 at the fuels rods' 1 lower end to an upper plate 19 at the fuel rods' 1 upper end.

Figure 3:
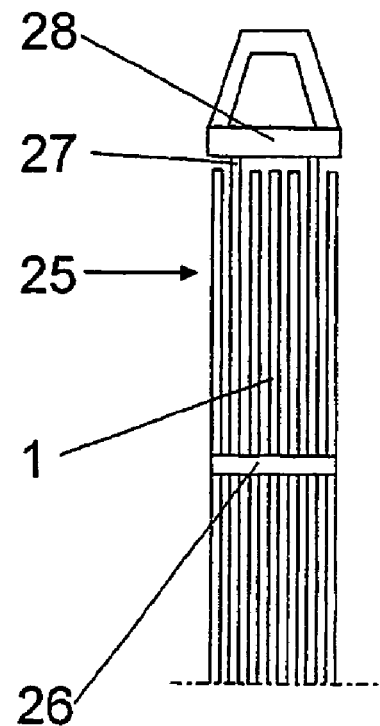
FIG. 3 schematically shows a side view of nuclear fuel assembly for a pressurized water reactor with a number of nuclear fuel rods according to the invention.
Figure 3:
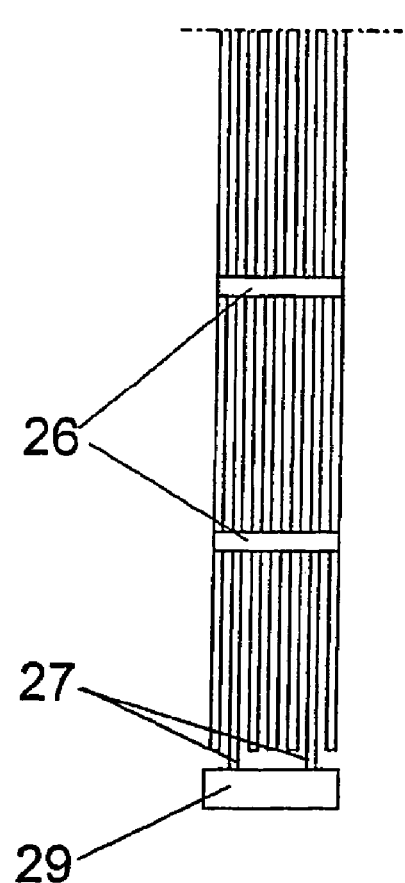

FIG. 3 schematically shows in a corresponding way an example of a nuclear fuel assembly 25 for a pressurized water reactor. The nuclear fuel assembly 25 also comprises nuclear fuel rods 1 according to the present invention and a number of spacers 26 along the nuclear assembly's 25 length. The spacers in this case also have the task of gripping the conduits 27 that extend through the bundle of fuel rods 1 and that are connected to a bottom member 28 at their lower ends and to a top member 29 at their upper ends.

The cladding tube 2 of the fuel rods can be pre-oxidized on its inner surface, i.e. on the inner surface of the inner tube 7, or on the inner surface of the outer tube 6 if there is no liner. This means that a thin oxide layer has been produced on the inner surface before the nuclear fuel rods 1 are mounted, i.e. before the fuel pellets 9 are introduced into the cladding tube 2, the fill gas is added and the cladding tube 2 is concluded. The inner surface is therefore formed from a surface layer that comprises zirconium oxide or essentially consists of zirconium oxide. Such a zirconium oxide layer or such a zirconium oxide coating can be very thin with a thickness that is less than 2 μm and preferably less than 1 μm. The oxide layer is preferably produced by means of autoclaving, anodizing or exposure to dry oxygen gas, whereby a high density oxide layer can be achieved.

The applicant has carried out laboratory investigations that show that a lower CO-addition in hydrogen reduces the speed with which a zirconium-based material, pre-oxidized or not, absorbs hydrogen. The result of these investigations is indicated in FIGS. 4 to 8.

Figure 4:
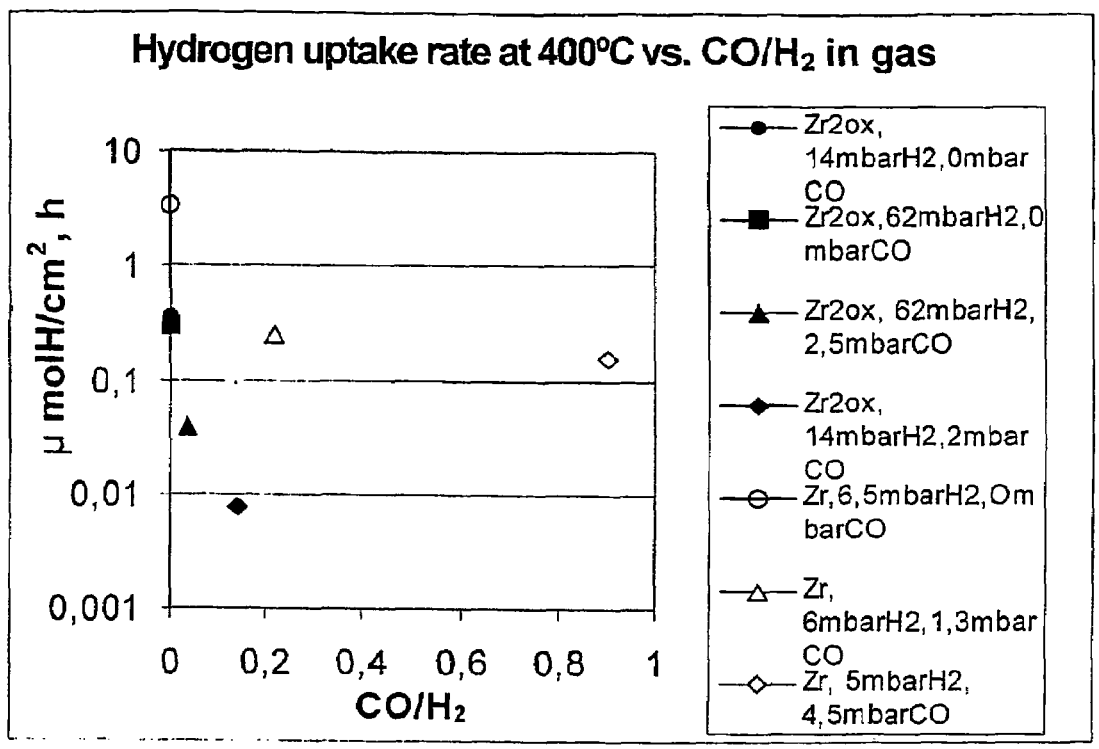
FIG. 4 shows a graph of zirconium-based materials' hydrogen absorption speed for different $CO/H_2$-ratios.

FIG. 4 shows a graph of the hydrogen absorption speed at 400° C. at different $CO/H_2$-ratios for pre-oxidized zirconium material (pre-oxidized Zircaly-2, Zr2ox) and non-pre-oxidized zirconium material (pure zirconium, Zr). It can be seen that for pure zirconium the hydrogen absorption at $ppCO/ppH_2$ approximately equal to 0.2 is reduced by a factor of 10 compared to when no CO has been added. For a pre-oxidized zirconium-based alloy a corresponding factor-of-10 reduction is obtained already at $ppCO/ppH_2$ approximately equal to 0.04.

Figure 5:
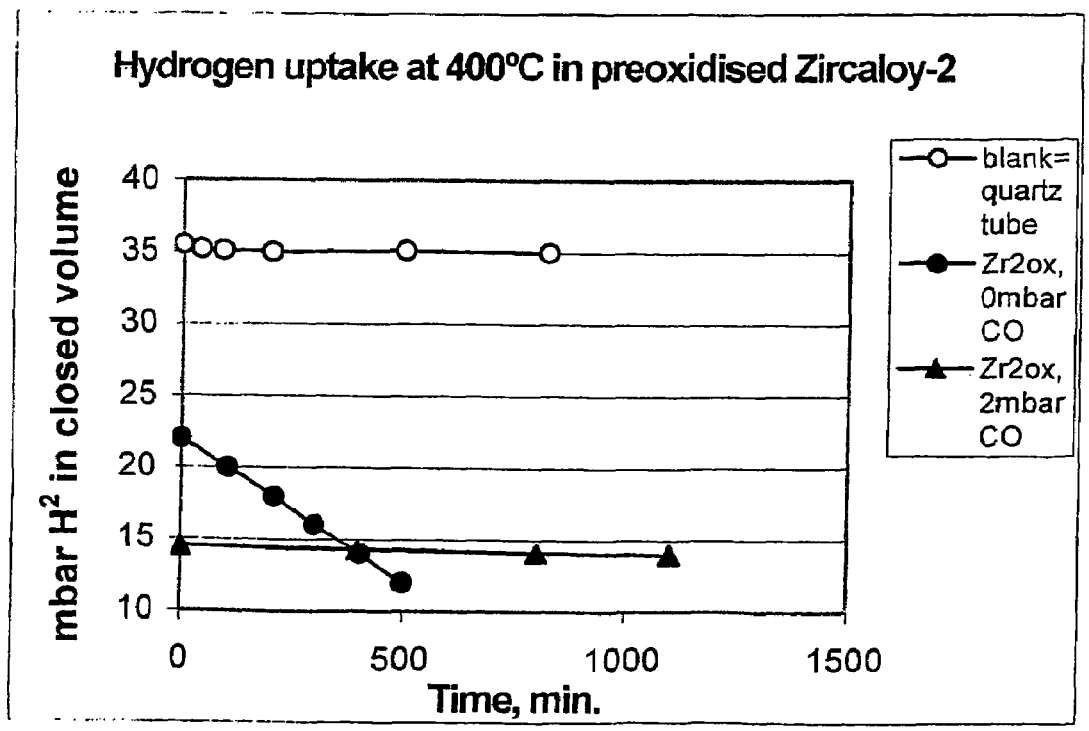
FIG. 5 shows a graph of how the partial pressure of $H_2$ in a closed space changes as a function of time when a zirconium-based material is exposed to $H_2$ in an atmosphere with different partial pressures of CO.

FIG. 5 shows a graph of the absorption of hydrogen at 400° C. in a pre-oxidized zirconium alloy (Zircaloy-2), where it can be seen that $ppH_2$ in a closed space containing a pre-oxidized zirconium alloy is essentially constant with time at $ppCO=2$ mbar and $ppCO/ppH_2=0,14$.

Figure 6:
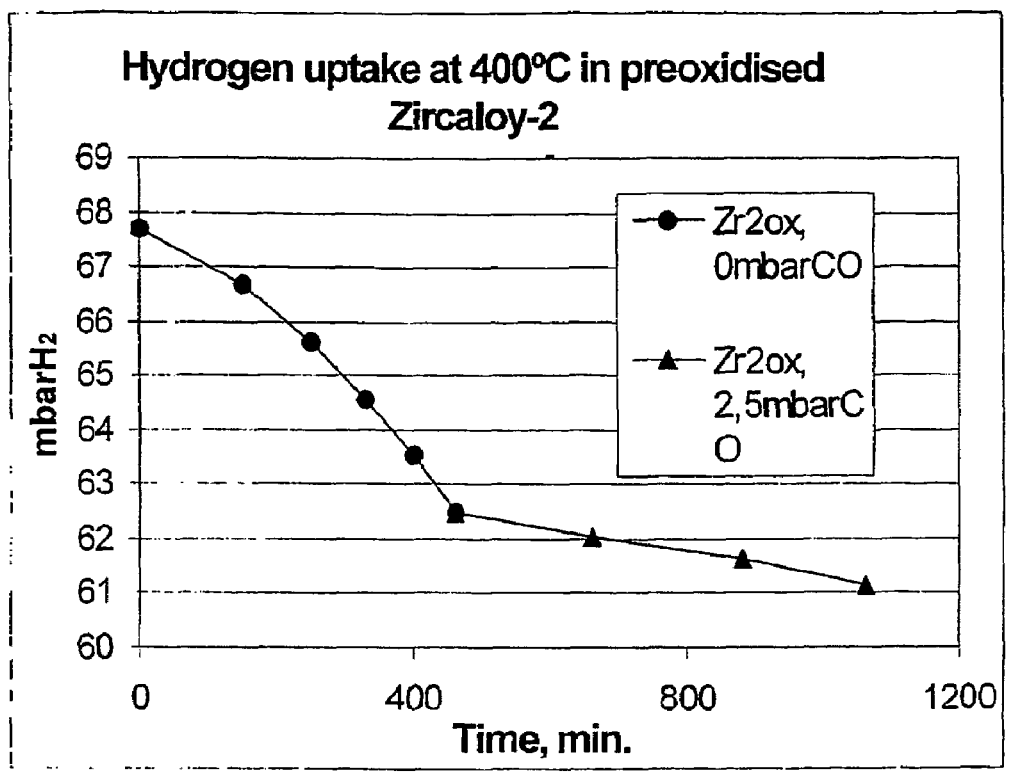
FIG. 6 shows another graph of how the partial pressure of $H_2$ in a closed space changes as a function of time when a zirconium-based material is exposed to $H_2$ in an atmosphere where the partial pressure of CO changes during the exposure.

FIG. 6 shows another graph of the absorption of hydrogen at 400° C. in pre-oxidized Zircaloy-2, whereby CO is added after about 400 min so that $ppH_2$ amounts to 2.5 mbar and $ppCO/ppH_2=0.04$. A clear reduction of the hydrogen absorption can then be observed.

Figure 7:
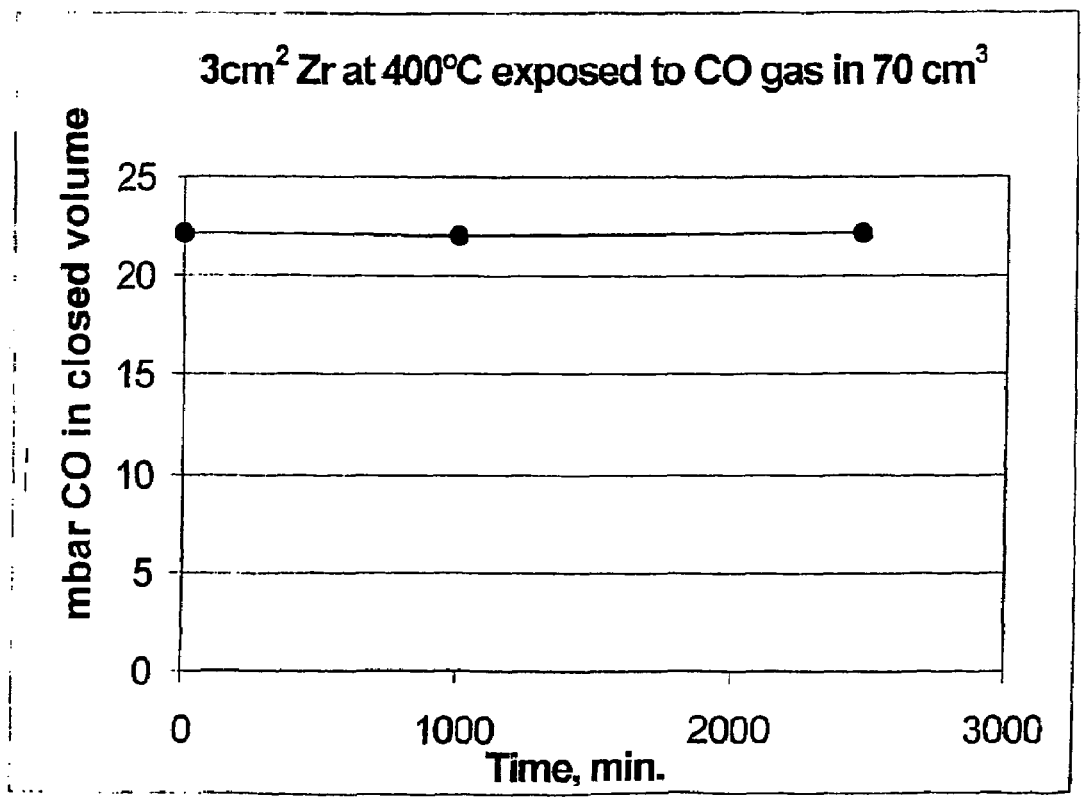
FIG. 7 shows a graph of the partial pressure of CO in a closed space with Zr as a function of time.

FIG. 7 shows a graph of the partial pressure of CO in a closed space with Zr as a function of time. It can be seen from the graph that the CO-gas will not be absorbed by Zr even if CO-molecules are adsorbed on the zirconium surface.

Figure 8:
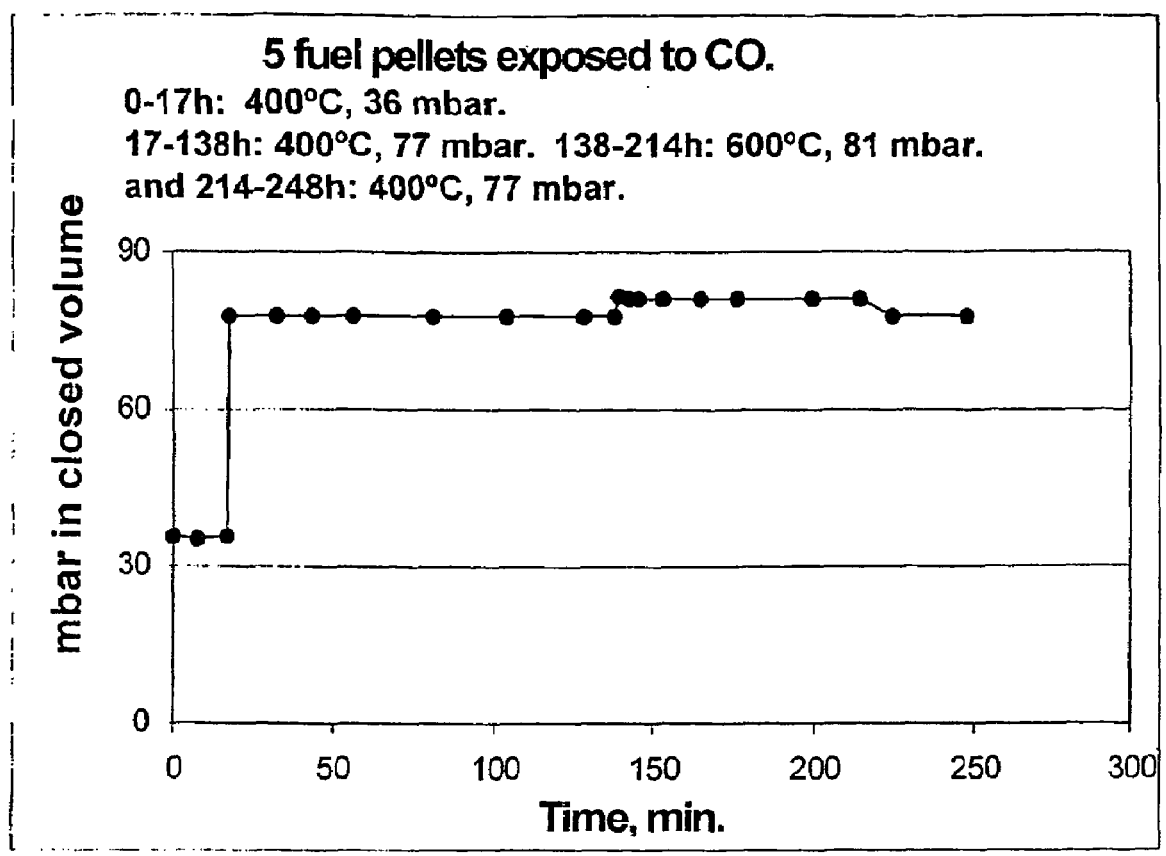
FIG. 8 shows a graph of the partial pressure of CO in a closed space with five nuclear pellets as a function of time.

FIG. 8 shows a graph of the partial pressure of CO in a closed space with five fuel pellets as a function of time. It can be seen from the graph that no CO is absorbed by the fuel pellets at 400° C. and not at 600° C. either.

On exposure of zirconium-based alloys, such as Zircaloy-2 or Zircaloy-4, to a hydrogen gas atmosphere with varying partial pressure of carbon monoxide, ppCO, the investigations that have been carried out show that a relatively low partial pressure of carbon monoxide ($ppCO/ppH_2$ approximately equal to 0.2, see FIG. 4) has a drastic effect on the speed with which the metal absorbs hydrogen. The absorption speed is decreased approximately by a factor of 10 compared to the case when the metal is exposed to pure hydrogen gas. The effect is accentuated when the zirconium-based material is pre-oxidized. In this case a drastically reduced absorption speed has been observed already when $ppCO/ppH_2$ is approximately equal to 0.04. The investigations also show that pre-oxidation per se strongly reduces the hydrogen absorption speed, but that pre-oxidation in combination with addition of carbon monoxide further decreases the absorption speed drastically, see FIG. 4. In this case the absorption speed, at $ppCO/ppH_2=0.04$, is approximately a factor 100 lower than when non-pre-oxidized zirconium-based material is exposed to hydrogen gas and the absorption speed can be further reduced if the partial pressure carbon monoxide is increased.

Under the assumption that one has a mixture of the initial fill gas, in this case He and CO, and hydrogen gas at a distance from a primary defect immediately after the defect has occurred and that the value $ppCO/ppH_2$ should exceed a certain critical value, $F_{krit}$, one can estimate the lowest ppCO that the fill gas should contain. As it is the absolute value of ppCO that is of interest in this case the consequence is that ppCO/ppHe can decrease with increasing ppCO+ppHe under the assumption that the reactor's system pressure is constant. The latter is a reasonable assumption, but means that the choice of ppCO can vary between fuel rods that are manufactured for boiling water reactors (BWR), where the system pressure, $P_{sys}$, is typically about 70 bar, and for pressurized water reactors (PWR), where the system pressure, $P_{sys}$, is normally about 150 bar.

If a fuel rod's fill pressure at room temperature, $T_R$, is $P_{fill}$ and the pressure in a fuel rod increases by a factor A (typically 2-3) when the fuel rod's temperature increases from room temperature, $T_R$, to operational temperature, the fuel rod will initially, in operation, have an internal pressure, $P_i$, that is $P_i = P_{fill} * A$. If $P_{sys}$ is the system pressure and if the pressure equilibrium between the rod's inner pressure and the system pressure occurs after a primary defect this means that the average value of $ppH_2O+ppH_2$ calculated over the entire length of the fuel rod after a primary defect can be assumed to be $ppH_2O+ppH_2=P_{sys}-P_i$. At a distance from the primary defect $ppH_2O$ is negligible during the time directly after a primary defect occurs while $ppH_2$ is relatively very high depending on the water molecules' quick reaction with the inside of the cladding, during the formation of zirconium oxide and the release of hydrogen, in combination with the higher diffusion speed of hydrogen gas as has been disclosed above. One can, at a distance from the primary defect during the actual period of time, assume that the gas locally consists of a mixture of fill gas (He+CO) and $H_2$ and that $ppH_2$ locally satisfies the relationship:

$$P_{sys}-Pi < ppH_2 < P_{sys}$$

Since the fraction $ppCO/ppH_2$ should be above a certain critical value, $F_{krit}$, and ppCO is $ppCO(T_R)*A$ at operational temperature, $ppCO(T_R)$ should be $$ppCO(T_R)=F_{krit}*ppH_2/A=F_{krit}*(P_{sys}-P_i)/A=F_{krit}*(P_{sys}-P_{fill}*A)/A.$$

The following table shows different examples of the amount of CO expressed as partial pressure and volume percent in a BWR and PWR for different $P_{fill}$, $F_{krit}$ and A values. Additional values of the amount of CO can be simply calculated using the formula given for other $P_{fill}$, $P_{sys}$, $F_{krit}$ and A values. $F_{krit}$ 0.02 and 0.03 are exemplified in the table. Already at these two relatively low CO-contents in relation to the amount of hydrogen gas a considerable reduction of hydrogen absorption is obtained as can be seen from FIG. 4, especially if the zirconium surface is preoxidized. Within the scope of the present invention a lower reduction of hydrogen absorption and therefore a lower amount of carbon monoxide in the fill gas than that which has been stated in the following table for specific internal pressures $P_{fill}$ may be chosen. If the zirconium surface is not oxidized $F_{krit}$ should be somewhat higher as can be seen from FIG. 4, which results in an initially higher volume percent of CO.

| $P_{fill}$ Bar (abs) | $P_{sys}$ bar (abs) | $F_{krit}$ | A | ppCO bar (abs) | Vol-% CO |
|---|---|---|---|---|---|
| 2 | 70 | 0.02 | 2 | 0.66 | 33.0 |
| 3 | 70 | 0.02 | 2 | 0.64 | 21.3 |
| 4 | 70 | 0.02 | 2 | 0.62 | 15.5 |
| 4 | 70 | 0.02 | 2.5 | 0.48 | 12.0 |
| 4 | 70 | 0.02 | 3 | 0.39 | 9.75 |
| 4 | 70 | 0.03 | 2 | 0.93 | 23.3 |
| 4 | 70 | 0.03 | 2.5 | 0.72 | 18.0 |
| 4 | 70 | 0.03 | 3 | 0.68 | 17.0 |
| 5 | 70 | 0.02 | 2 | 0.60 | 12.0 |
| 5 | 70 | 0.02 | 2.5 | 0.46 | 9.20 |
| 5 | 70 | 0.02 | 3 | 0.43 | 8.60 |
| 5 | 70 | 0.03 | 2 | 0.90 | 18.0 |
| 5 | 70 | 0.03 | 2.5 | 0.81 | 16.2 |
| 5 | 70 | 0.03 | 3 | 0.65 | 13.0 |
| 6 | 70 | 0.02 | 2 | 0.58 | 9.6 |
| 6 | 70 | 0.02 | 2.5 | 0.44 | 7.3 |
| 6 | 70 | 0.02 | 3 | 0.34 | 5.7 |
| 7 | 70 | 0.02 | 2 | 0.56 | 8.0 |
| 7 | 70 | 0.02 | 2.5 | 0.42 | 6.0 |
| 7 | 70 | 0.02 | 3 | 0.33 | 4.6 |
| 10 | 150 | 0.02 | 2 | 1.3 | 13.0 |
| 15 | 150 | 0.02 | 2 | 1.2 | 8.00 |
| 20 | 150 | 0.02 | 2 | 1.1 | 5.50 |
| 20 | 150 | 0.02 | 2.5 | 0.8 | 4.00 |
| 20 | 150 | 0.02 | 3 | 0.6 | 3.00 |
| 20 | 150 | 0.03 | 2 | 1.65 | 8.25 |
| 20 | 150 | 0.03 | 2.5 | 1.2 | 6.00 |
| 20 | 150 | 0.03 | 3 | 0.9 | 4.50 |
| 25 | 150 | 0.02 | 2 | 1.0 | 4.00 |
| 25 | 150 | 0.02 | 2.5 | 0.75 | 3.00 |
| 25 | 150 | 0.02 | 3 | 0.5 | 2.00 |
| 25 | 150 | 0.03 | 2 | 1.5 | 6.00 |
| 25 | 150 | 0.03 | 2.5 | 1.05 | 4.20 |
| 25 | 150 | 0.03 | 3 | 0.75 | 3.00 |

The invention is not limited to the embodiments shown but can be varied and modified within the scope of the following claims.

What is claimed is:

1. A nuclear fuel rod for a boiling water nuclear reactor, comprising:

a cladding tube, defining a closed inner space and which is manufactured from at least one of the materials in the group zirconium and a zirconium-based alloy, the material of the cladding tube comprising a plurality of sites in which hydrogen is capable of being adsorbed;

a plurality of nuclear fuel pellets, arranged in the inner space in the cladding tube so that the nuclear fuel pellets fill pan of the inner space;

an initial fill gas arranged in the closed inner space in order to fill the rest of the inner space;

wherein the initial fill gas contains a proportion of inert gas and a proportion of carbon monoxide, the carbon monoxide being located in the sites in which hydrogen is capable of being adsorbed, thereby blocking the sites; and wherein the internal pressure ($P_{fill}$) of the initial gas in the nuclear fuel rod amounts to at least about 7 bar (abs) at room temperature ($T_R$) and the proportion of carbon monoxide is at least 4.7 volume percent of the initial fill gas; and wherein the cladding tube has an inner surface that faces the inner space and the material in the cladding tube nearest the inner surface is pre-oxidized to provide a surface layer that comprises zirconium oxide.

2. A nuclear fuel rod according to claim 1, wherein the proportion of carbon monoxide constitutes at least 5 volume percent of the initial fill gas.

3. A nuclear fuel rod according to claim 2, wherein the proportion of carbon monoxide constitutes at least 6 volume percent of the initial fill gas.

4. A nuclear fuel rod according to claim 1, wherein the inert gas consists substantially of helium.

5. A nuclear fuel assembly for a boiling water nuclear reactor, said nuclear fuel assembly comprising a plurality of nuclear fuel rods, each fuel rod including:
- a cladding tube, defining a closed inner space and which is manufactured from at least one of the materials in the group zirconium and a zirconium-based alloy, the material of the cladding tube comprising a plurality of sites in which hydrogen is capable of being adsorbed;
- a plurality of nuclear fuel pellets, arranged in the inner space in the cladding tube so that the nuclear fuel pellets fill pan of the inner space;
- an initial fill gas arranged in the closed inner space in order to fill the rest of the inner space;
- wherein the initial fill gas contains a proportion of inert gas and a proportion of carbon monoxide, the carbon monoxide being located in the sites in which hydrogen is capable of being adsorbed, thereby blocking the sites; and wherein
- the internal pressure ($P_{fill}$) of the fill gas in the nuclear fuel rod amounts to at least about 7 bar (abs) at room temperature ($T_R$) and the proportion of carbon monoxide is at least 4.7 volume percent of the initial fill gas; and
- wherein the cladding tube has an inner surface that faces the inner space and the material in the cladding tube nearest the inner surface is pre-oxidized to provide a surface layer that comprises zirconium oxide.

6. A nuclear fuel rod for a boiling water nuclear reactor, comprising:
- a cladding tube, defining a closed inner space and which is manufactured from at least one of the materials in the group zirconium and a zirconium-based alloy, the material of the cladding tube comprising a plurality of sites in which hydrogen is capable of being adsorbed;
- a plurality of nuclear fuel pellets, arranged in the inner space in the cladding tube so that the nuclear fuel pellets fill pan of the inner space;
- an initial fill gas arranged in the closed inner space in order to fill the rest of the inner space;
- wherein the initial fill gas contains a proportion of inert gas and a proportion of carbon monoxide, the carbon monoxide being located in the sites in which hydrogen is capable of being adsorbed, thereby blocking the sites; and wherein
- the internal pressure ($P_{fill}$) of the initial gas in the nuclear fuel rod amounts to at least about 6 bar (abs) at room temperature ($T_R$) and the proportion of carbon monoxide is at least 5.7 volume percent of the initial fill gas; and
- wherein the cladding tube has an inner surface that faces the inner space and the material in the cladding tube nearest the inner surface is pre-oxidized to provide a surface layer that comprises zirconium oxide.

7. A nuclear fuel assembly for a boiling water nuclear reactor, said nuclear fuel assembly comprising a plurality of nuclear fuel rods, each fuel rod including:
- a cladding tube, defining a closed inner space and which is manufactured from at least one of the materials in the group zirconium and a zirconium-based alloy, the material of the cladding tube comprising a plurality of sites in which hydrogen is capable of being adsorbed;
- a plurality of nuclear fuel pellets, arranged in the inner space in the cladding tube so that the nuclear fuel pellets fill pan of the inner space;
- an initial fill gas arranged in the closed inner space in order to fill the rest of the inner space;
- wherein the initial fill gas contains a proportion of inert gas and a proportion of carbon monoxide, the carbon monoxide being located in the sites in which hydrogen is capable of being adsorbed, thereby blocking the sites; and wherein
- the internal pressure ($P_{fill}$) of the initial gas in the nuclear fuel rod amounts to at least about 6 bar (abs) at room temperature ($T_R$) and the proportion of carbon monoxide is at least 5.7 volume percent of the initial fill gas; and
- wherein the cladding tube has an inner surface that faces the inner space and the material in the cladding tube nearest the inner surface is pre-oxidized to provide a surface layer that comprises zirconium oxide.

* * * * *